J. W. BROWN.
PIANO TRUCK.
APPLICATION FILED OCT. 31, 1914.
1,164,332.
Patented Dec. 14, 1915.
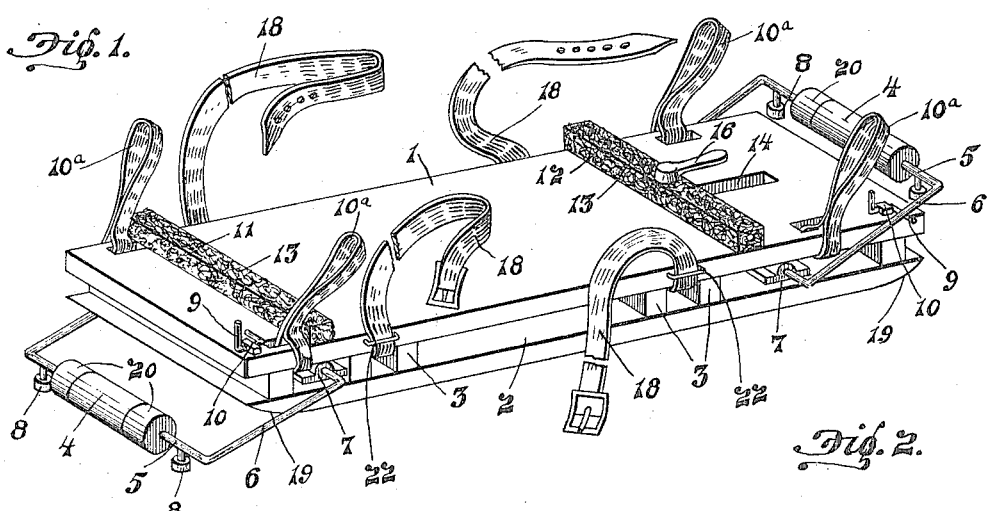
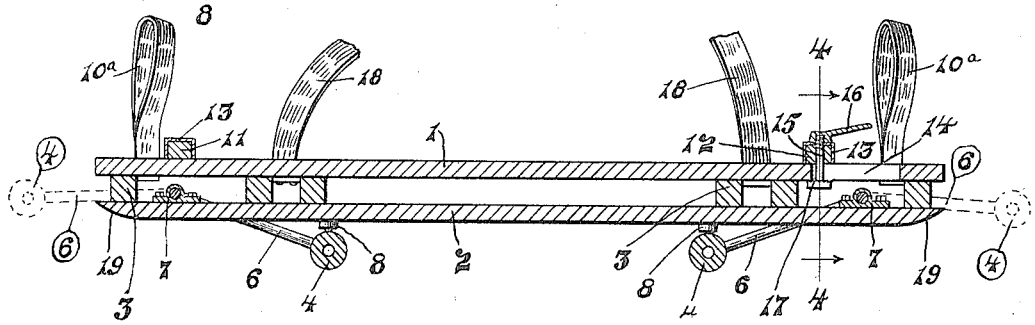
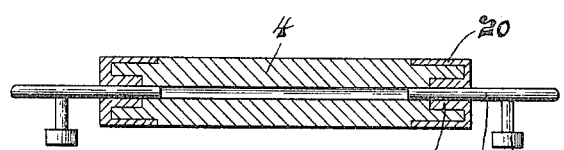
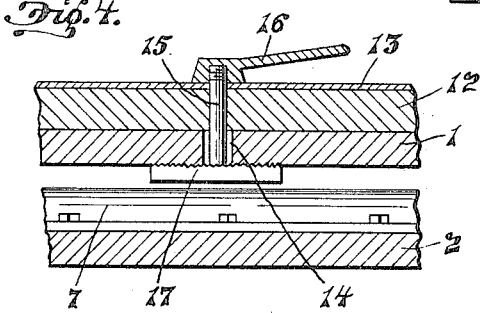
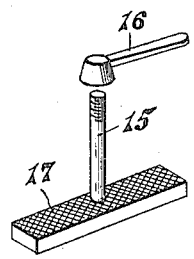
Witnesses
R. O. Karcher
Sylvia Boron
Inventor
James W. Brown.
By F. W. Bond
Attorney

UNITED STATES PATENT OFFICE.

JAMES W. BROWN, OF CANTON, OHIO.

PIANO-TRUCK.

1,164,332.　　　　　Specification of Letters Patent.　　Patented Dec. 14, 1915.

Application filed October 31, 1914. Serial No. 869,592.

*To all whom it may concern:*

Be it known that I, JAMES W. BROWN, a citizen of the United States, residing at Canton, in the county of Stark and State of Ohio, have invented a new and useful Piano-Truck, of which the following is a specification.

My invention relates to improvements in piano trucks designed to move pianos and other heavy articles from place to place.

The objects of the present invention are, first, to provide a truck of simple construction, easily operated and well adapted for the easy movement of pianos, either square or upright; second, to so construct the truck that it may be used to move the load carried thereon upon rollers when moved over level or horizontal surfaces; third, to so construct the truck that it can be quickly changed from a rolling truck to a sliding one; fourth, to provide means for holding the rollers in position for contact with the surface over and upon which the truck is designed to travel and out of contact with the underside of the truck proper; and fifth, to provide means for holding the rollers in position with reference to the truck so that they will not interfere or be in the way during the time the truck is used for moving pianos up or down stairs or upon inclined surfaces. These objects, together with other objects, readily apparent to those skilled in the art I attain by the construction illustrated in the accompanying drawings, although my invention may be embodied in a variety of other mechanical forms, the construction illustrated being chosen by way of example.

In the accompanying drawings: Figure 1 is a perspective view showing the supporting rollers out of position for use as supports. Fig. 2 is a longitudinal section. Fig. 3 is a sectional view of one of the rollers. Fig. 4 is a section showing a portion of the truck base and illustrating the clamp, said section being taken on line 4—4, Fig. 2, looking toward the right hand end of said figure. Fig. 5 is a detached view of the clamp designed to hold in position the adjustable cross block or head.

Similar numerals of reference indicate corresponding parts in all the figures of the drawing.

In the accompanying drawing, 1 represents the upper base member and 2 the lower base member, said members being formed of a size to properly support and hold the piano either upright or square. The members 1 and 2 are spaced apart as best illustrated in Figs. 1 and 2 and are held in proper spaced relationship and in fixed relationship with reference to each other by means of the cross bars 3, said cross bars being securely attached to the upper and lower base members 1 and 2 in any convenient and well known manner. The purpose of forming the base or support as above described is to provide a base or support that will be light and at the same time possess sufficient rigidity to carry a piano or other heavy article designed to be transported.

In some instances it is desirable to rest the bottom or underside of the base upon the surface over and upon which the truck proper and its load is to be moved. In the moving of pianos up and down stairs it is more convenient and more practical to slide or slip the truck or supporting base over and upon the stairs. In other instances it is desirable to mount the truck proper upon rollers so that the truck together with its load can be moved or conveyed over and upon the floor, supported upon suitable traveling rollers.

In order to provide for either a slipping or sliding movement or rolling movement as may be desired I provide suitable rollers 4, which rollers are mounted upon the inward angled portions 5 which are formed upon the free ends of the roller carrying bails 6, which bails are journaled in the bearings 7, said bails being securely connected to the base proper, preferably to the lower member 2. When it is desired to mount the truck proper upon the rollers 4, the bails or roller carrying members 6 are brought under the truck as best illustrated in Fig. 2, at which time the truck is free to be rolled or moved over and upon a level or smooth surface.

It will be understood that the rollers 4 should be held out of contact with the bottom or underside of the lower truck member 2, so that the rollers 4 will be free to rotate without coming in contact with the underside of the lower truck member 2. In order to accomplish this result or more specifically, in order to hold the rollers 4 in such a position that they will not bear upon the underside of the truck the bails 6 are provided with the contact heads 8, said heads being formed of such a length that they will come in contact with the underside of the truck proper, thus leaving a space between the rollers and the under face of the truck. It will also be understood that it is of importance that no tilting action will take place during the time a piano or other heavy object is being moved and in order to prevent any tilting action the rollers 4 are formed of such a length that they will withstand themselves provide sufficient support and at the same time provide suitable traveling means for the truck. Heretofore it has been common to mount trucks upon four wheels, two located upon opposite sides of the truck without any intermediate support, but I have discovered that the supports should come directly under the load and the supporting rollers being formed of sufficient length to prevent any sagging or tilting.

When it is desired to hold the rollers 4 out of operative position they may be located in the positions shown at the right hand end of Fig. 1 or the left hand end. In some instances it may be desirable to hold the rollers in an elevated position as I have illustrated at the right hand end of Fig. 1 and when it is desired to so hold the rollers the bails or roller carrying members 6 are placed upon the pivoted arms 9, said arms being journaled in suitable blocks or bearings 10. I have illustrated the pivoted brackets as consisting of short portions of wire or rods bent as shown, but it may be understood that any other form may be used as the only object is to provide what might be termed a removable support and so arrange the same that they can be moved so that the rollers can be brought into the positions shown at either end of the truck as illustrated in Fig. 1.

It is well understood that some provision should be made for moving the truck and in order to provide for moving the truck, pull loops 10$^a$ are provided, which are attached to the upper member 1 of the truck. It will also be understood that in the movement of pianos it is of importance that the same be held against slipping movement upon the truck proper and this is especially true of upright pianos. In order to prevent any slipping movement I provide, two contact heads or bars 11 and 12 located transversely across the truck.

For the purpose of preventing any marring or scratching of the piano the holding blocks are covered with felt 13. It will be understood that the holding blocks 11 and 12 should be located against the ends of the piano and in order to provide for thus abutting the holding blocks against the ends of the piano at least one of the holding blocks or heads should be adjustably attached to the truck and means provided for holding such adjustable block or head in fixed adjustment. The upper member 1 is provided with the elongated slot 14 through which slot is located the bolt 15, one end of which is screw threaded to receive the screw threaded clamping member 16, which clamping member may be of the form shown or it may be of any other desired form such as an ordinary wing nut. The lower end of the bolt 15 is provided with the cross head 17, which cross head is roughened upon its contact face, so that when it is brought in close contact with the bottom or underside of the upper member 1 and clamped it will be held against slipping movement. In order to place the bolt 15 and its head 17 in proper position the head 17 is placed parallel with the elongated slot 14 and passed through the same and into the space between upper and lower members 1 and 2, after which it can be turned at right angles to the slot 14 and clamped by means of the clamp or nut 16. The truck should be provided with the holding straps 18, said straps being formed of a length sufficient to properly clamp the piano upon the truck.

When it is desired to place a square piano upon the truck it may become necessary and frequently is to remove one of the end abutting blocks or bars 11 or 12 and place the square piano directly upon the upper face of the truck. By detachably or adjustably connecting one of the abutting bars or blocks 12 or 11 to the truck, said bars can be brought into position or brought out of the way whereby the truck can be used for handling upright or square pianos. I am also enabled to handle a piano while in its shipping case or box. For the purpose of allowing the base proper to be slid when the rollers 4 are removed from under the same the ends of the lower member 2 should be beveled as illustrated at 19. It will also be understood that in order to provide suitable bearings for the rollers metal caps 20 should be provided, which metal caps are provided with the inward extending bearings 21. By forming the truck base of separable or spaced members, room is provided for the holding straps 18, which straps are connected to the base by means of the staples 22.

It is well understood that in moving pianos it is frequently necessary to pass the truck over and upon polished floors and owing to the heavy load there is danger of marring the surface over and upon which the truck is moved. This trouble is overcome by forming the rollers of considerable length so that there is more contact surface presented and less liability to mar and scratch the surface upon which the rollers come in contact.

Having fully described my invention what I claim as new and desire to secure by Letters Patent, is:

1. In a piano truck, the combination of a base made up of spaced members, means for holding said spaced members in spaced relationship with reference to each other, bails pivotally connected to the base, rollers rotatably mounted upon said bails, said bails adapted to be swung around the ends of the base members, and said bails provided with contact heads, said contact heads located at opposite ends of the rollers.

2. In a piano truck, the combination of a base made up of spaced members, means for holding said spaced members in spaced relationship with reference to each other, bails pivotally connected to the base, rollers rotatably mounted upon said bails, said bails adapted to be swung around the ends of the base members, and said bails provided with contact heads, said contact heads located at opposite ends of the rollers, and means for holding the bails and rollers in elevated positions above the base.

3. In a piano truck, the combination of a base, said base made up of spaced members, the uppermost member provided with an elongated slot, a bolt adapted to be located through said elongated slot and provided with a cross head, said cross head adapted for contact with the under side of the uppermost base member, a clamping nut located upon said bolt and an abutting block located upon the uppermost member of the base, bails pivotally connected to the lowermost base member, said bails provided with carrying rollers and contact heads, said contact heads located at the opposite ends of the carrying rollers.

4. In a piano truck, the combination of a base, said base made up of spaced members, the uppermost member provided with pull loops, said loops located at opposite ends of the truck, bails pivotally connected to the base and rollers mounted upon said bails, the length of said rollers corresponding substantially with the width of the base, and means for limiting the movement of the bails in an upward direction when under the base.

5. In a piano truck, the combination of a base, said base made up of spaced members, the lowermost member provided with beveled ends, the uppermost member provided with pull loops, said loops located at opposite ends of the truck, bails pivotally connected to the base and rollers mounted upon said bails, the length of said rollers corresponding substantially with the width of the base, and means for limiting the movements of the bails in an upward direction when under the base.

In testimony that I claim the above, I have hereunto subscribed my name in the presence of two witnesses.

JAMES W. BROWN.

Witnesses:
 JOHN H. BISHOP,
 SYLVIA BORON.

Copies of this patent may be obtained for five cents each, by addressing the "Commissioner of Patents, Washington, D. C."